United States Patent
Shah et al.

(10) Patent No.: US 11,115,551 B2
(45) Date of Patent: Sep. 7, 2021

(54) DEVICE FOR PERFORMING SECURE AND AUTOMATIC FLIPPING AND SCANNING OF DOCUMENTS

(71) Applicant: Tata Consultancy Services Limited, Mumbai (IN)

(72) Inventors: Viral Prakash Shah, Thane (IN); Shobhit Shukla, Thane (IN); Nihar Nilax Pandit, Thane (IN); Sachin Ramdas Naik, Thane (IN); Ankush Sharma, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/929,938

(22) Filed: Jul. 15, 2020

(65) Prior Publication Data
US 2021/0044715 A1    Feb. 11, 2021

(30) Foreign Application Priority Data

Jul. 16, 2019 (IN) .............................. 201921028671

(51) Int. Cl.
*H04N 1/00* (2006.01)
*B65H 15/00* (2006.01)
(Continued)

(52) U.S. Cl.
CPC ....... *H04N 1/00806* (2013.01); *B65H 15/016* (2020.08); *G06K 7/1413* (2013.01);
(Continued)

(58) Field of Classification Search
CPC .......... H04N 1/00806; H04N 1/00018; H04N 1/00037; H04N 1/00076; H04N 1/00244;
(Continued)

(56) References Cited

U.S. PATENT DOCUMENTS 8,646,193 B1    2/2014    Fong-Jhou et al.
9,266,376 B1    2/2016    Mah
(Continued)

FOREIGN PATENT DOCUMENTS

CN    104184919 A    12/2014
JP      6372591 B2     7/2018

OTHER PUBLICATIONS

M.T. Nikam et al., "Automatic Book Scanning", International Journal of Advanced Research in Electronics and Communication Engineering (IJARECE), Feb. 2016., vol. 5, Issue 2, Semantic Scholar, pp. 343-347.
(Continued)

*Primary Examiner* — Moustapha Diaby
(74) *Attorney, Agent, or Firm* — Finnegan, Henderson, Farabow, Garrett & Dunner, LLP

(57) ABSTRACT

Organizations and educational institutions are turning towards digitization of their examination processes. The existing devices are costly, time consuming and insecure for scanning the answer sheets. A device for performing secure and automatic flipping and scanning of documents has been provided. The device is configured to be assembled in the form of a box. The device comprising a scanning stand, a page flipping arm, one or more suction cups, one or more rollers, a controller and a mobile device. The controller is configured to control the operation of the scanning stand, the page flipper arm and the roller. The mobile device further comprises a mobile application which is further configured to control controller. The device further configured to scan the handwriting of a candidate to avoid malpractice during the examination.

11 Claims, 6 Drawing Sheets

(51) Int. Cl.
  *G06K 7/14*   (2006.01)
  *G06K 9/68*   (2006.01)
(52) U.S. Cl.
  CPC ......... *G06K 7/1417* (2013.01); *G06K 9/6835* (2013.01); *H04N 1/00018* (2013.01); *H04N 1/00037* (2013.01); *H04N 1/00076* (2013.01); *H04N 1/00244* (2013.01); *B65H 2801/09* (2013.01)
(58) Field of Classification Search
  CPC .............. B65H 15/016; B65H 2801/09; G06K 7/1413; G06K 7/1417; G06K 9/6835
  See application file for complete search history.

(56)  References Cited

U.S. PATENT DOCUMENTS

2013/0077138 A1\* 3/2013 Shen .................. H04N 1/19594
                                                          358/498
2017/0066274 A1\* 3/2017 Hasegawa ................ B42D 9/06
2019/0092077 A1   3/2019 Hasegawa et al.

OTHER PUBLICATIONS

Yoshihiro Watanabe et al., "Automatic Page Turner Machine for High-speed Book Digitization", RSJ International Conference Intelligent Robots and Systems (IROS), 2013, IEEE, http://vigir.missouri.edu/~gdesouza/Research/Conference_CDs/IEEE_IROS_2013/media/files/0848.pdf.

\* cited by examiner

DEVICE FOR PERFORMING SECURE AND AUTOMATIC FLIPPING AND SCANNING OF DOCUMENTS

PRIORITY CLAIM

This U.S. patent application claims priority under 35 U.S.C. § 119 to: India Application No. 201921028671, filed on Jul. 16, 2019. The entire contents of the aforementioned application are incorporated herein by reference.

TECHNICAL FIELD

The disclosure herein generally relates to field of automated document scanning, and, more particularly, to a device for performing automatic flipping and scanning of documents without human intervention especially scanning answer sheets after an examination with additional security features.

BACKGROUND

Document scanning is the process of converting physical documents such as books, papers, answer sheets etc. into digital media such as images, electronic text, or electronic books (e-books) using an image scanner. Many public and private organizations have a need to digitize their large collections of books and bound documents. Digital media can be easily distributed, reproduced, and read on-screen. In addition to that digital media are more secured as compared to physical documents.

Not only organizations, educational institutions are also turning towards digitization of their examination processes. Normally answer sheets obtained after an examination are physical documents. Due to various benefits, these physical documents are digitized. The current process of scanning of answer sheets happens centrally, whereby documents are collected, moved to a central scanning center, scanned, and then finally sent back for storage. Due to the transportation of the answer sheets, there are always chances of malpractice in the answer sheets.

Traditional digitization of documents uses a standard flatbed scanner, which requires manual intervention for turning individual pages during the digitization process. Manually turning the pages and scanning each page of a book is labor intensive and time-consuming. Further they are typically very space inefficient, complex, expensive not appropriate for personal use.

Some of the prior arts using some type of automatic page turner and scanner. Automatic page turning and scanning is typically complex, error prone and costly. Further, these page turner and scanner are not made for educational institutions, where privacy need to be maintained. Often, robotic arms are used to effect page turning, necessarily increasing the size and cost of the device. The available devices are not suitable or even optimized for personal use. There is certainly a need for a personal use book digitizing device. With the prolific use of tablet computing devices like the iPad® and Android® devices, it would also be desirable for people to digitize their answer sheets at the same time maintaining the security of the same.

SUMMARY

Embodiments of the present disclosure present technological improvements as solutions to one or more of the above-mentioned technical problems recognized by the inventors in conventional systems. For example, in one embodiment, a device for automatic flipping and scanning of a plurality of answer sheets is provided. The device comprises a scanning stand, a page flipping arm, one or more suction cups, a roller, a controller, and a mobile device. The scanning stand configured to hold the plurality of answer sheets. The page flipping arm connected to the scanning stand, wherein the page flipping arm is configured to flip one or more pages of the answer sheets. The one or more suction cups attached on the page flipper arm, the one or more suction cups are configured to hold the page for flipping. The roller attached on the scanning stand configured to avoid flipping of more than one pages at a time. The controller to control the operation of the scanning stand, the page flipper arm and the roller. The mobile device configured to be attached on a holder present in the scanning stand, wherein the mobile device comprising a mobile application in communication with the controller, wherein the mobile application configured to: command the controller to initiate the flipping of a particular page from amongst the one or more pages; command, via the controller, the suction cup to hold the particular page and move the particular page up for flipping; command, via the controller, the roller to avoid flipping of more than one page at a time; command, via the controller, a camera present in the mobile device to scan the particular page; send the scanned page to a cloud server; and repetitively performing the step of commanding the controller to the sending of scanned page, until a predefined number of pages of the plurality of answer sheets are scanned.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
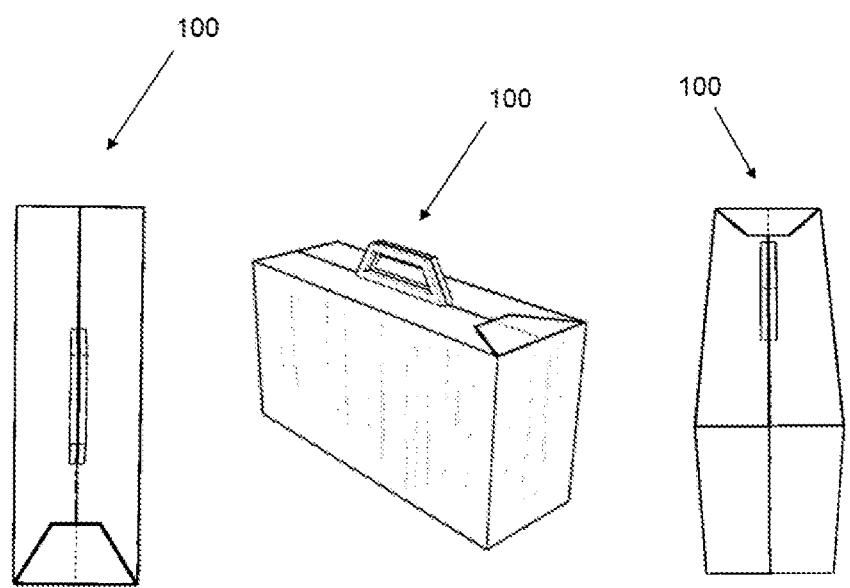
FIGS. 1A-1B illustrates various views of a device for automatic flipping and scanning of a plurality of documents, assembled in a box, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1A through FIG. 5B, where similar reference characters denote corresponding features consistently throughout the figures, there are shown preferred embodiments and these embodiments are described in the context of the following exemplary system/device.

Figure 1B:
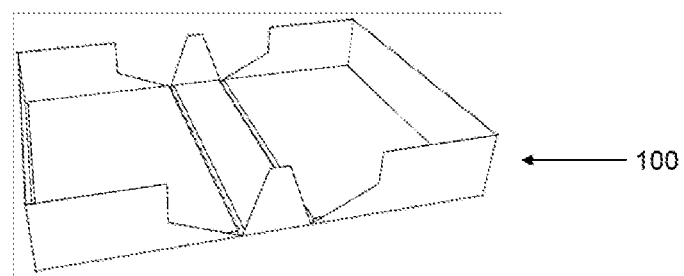

According to an embodiment of the disclosure, a device 100, assembled in a box, for performing automatic flipping and scanning of a plurality of documents such as answer sheets after an examination is shown in FIG. 1A-1B. It should be appreciated that FIG. 1A-1B is just an example representation of the device 100, the size, shape and design of the device 100 may modified by a person skilled in the art. The device 100 is configured to automatically scan the plurality of answer sheets after the examination intelligently without the human intervention. The scanning can be done using a mobile application running on a mobile device such as an Android® device or an iOS® device, which can integrate with its other components, i.e. a scanner stand, a page flipper arm and a controller. The device 100 is also configured to perform selective scanning of only a few pages from the plurality of answer sheets as per the requirement of the user. The device 100 is also configured to scan the documents in any direction either forward or backward.

According to an embodiment of the disclosure, the device 100 has been designed specifically for the secure and automatic flipping and scanning of the plurality of documents or the plurality of answer sheets. Though it should be appreciated that the plurality of documents may include a book, loosely placed a bunch of papers of any size, a bunch of papers stapled by a pin. In case of the answer sheets, it can be scanned and send securely to a cloud server (not shown in FIG.s) or at a distant location for further usage. The plurality of answer sheets are written by various candidates appearing for the examination.

According to an embodiment of the disclosure, the device 100 can be assembled in a box or a suitcase as shown in various views in FIG. 1A. The box is designed in a versatile way for traveling ease to carry a scanning solution as handy as it moves. The box is a securely locked carry to go scanning solution with a locking mechanism. An all-in-one box is been designed to carry all relevant equipment that are required for the functionality of scanning up to A2 size pages. An opened view of the box is shown in FIG. 1B.

According to an embodiment of the disclosure, primarily the box comprises a scanning stand 102, a holder 104 for holding a mobile device 106, a pair of detachable rails 108, a page flipping arm 110 along with one or more suction cups 112, one or more roller 114 integrated in each rails 108, a roller rod 116 and a controller 118. The mobile device 106 could be any electronic device which is capable of running a mobile application. The mobile device 106 may include a mobile phone, a tablet or any other similar device which can be attached to the holder 104. In an example, the mobile device can be the "TCS iON PAPER appliance".

In an example, the box is with a base of 25 inches (9.5"×6") and 18" inches of breadth when unlocked, would spread to a base size of more than an A2 size paper as shown in FIG. 1A-1B. On opening the box, the sides of the box would become the walls of the base to equip the scanning stand 102 at a dedicated spot provided to fix the stand. To steadily and securely fix and hold the scanning stand 102, it will required to be fixed on the center wall on a pre-designated section using a handy screw knob (not shown). As described above, base of box would open up of a size larger than an A2 size book with a dedicated marking for an easy placement of A2, A3 & A4 size book. The base is pre-equipped with the pair of detachable rails 108, one on each side. The center wall comprises the scan holder slot to fix the scanning stand 102.

According to an embodiment, the scanning stand 102 is a sturdy and a strong metal based stand. It is built to carry the weight of a 7" to 10" tablet device and can hold it steadily at an adjustable height. The scanning stand 102 would be of a height adjustable for the holder to scan pages from A4 size to A2 Size of the answer sheets. The scanning stand 102 is fixed on the center wall and fixed with a handy screw knob locking system.

According to an embodiment of the present disclosure, the controller 118 is configured to control the functioning of all activities of the scanning stand 102, the one or more suction cups 112, the page flipping arm 110 and the roller 114. The controller 118 is responsible for communicating with the mobile device 106 to receive and send commands for page flip completion, any critical alerts, failures etc. The controller 118 also contains the power unit that will supply power to various components of the device 100. The device 100 is capable of running on battery or mains power. In case there is no power, there is a limited mechanical capability to flip the pages manually so that the scanning operation can continue.

Figures 2A, 2B:
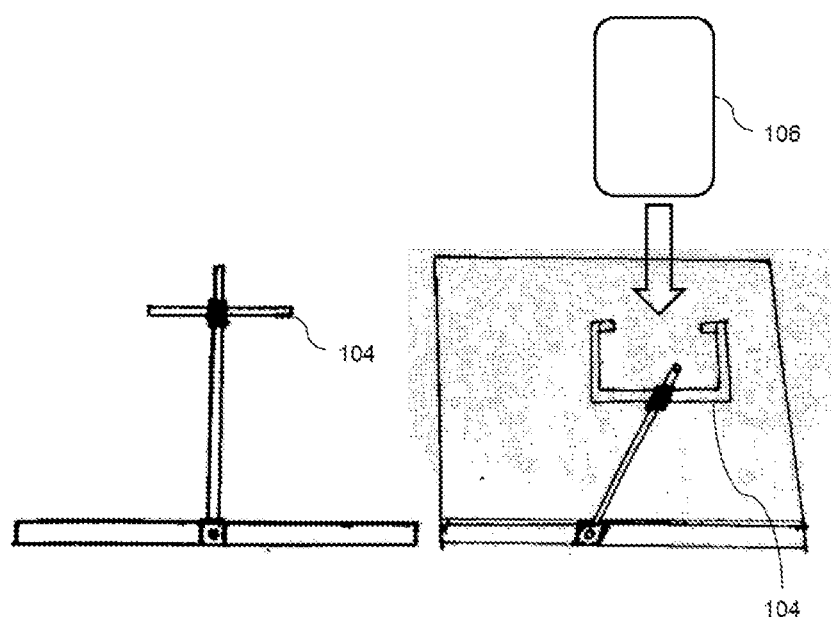
FIGS. 2A-2B illustrates a top view and front view a holder of the device of FIGS. 1A-1B, according to some embodiments of the present disclosure.

According to an embodiment of the present disclosure, the holder 104 is attached to the scanning stand 102 as shown in front view in FIG. 2A and top view in FIG. 2B. The holder 104 is a flexible holder that is designed to adjust and hold any tablet appliance or mobile device of varying size. The holder 104 is also equipped with USB connecter that will manage connecting mobile, connected to the USB port for data transmission to the controller 118.

Figure 3A:
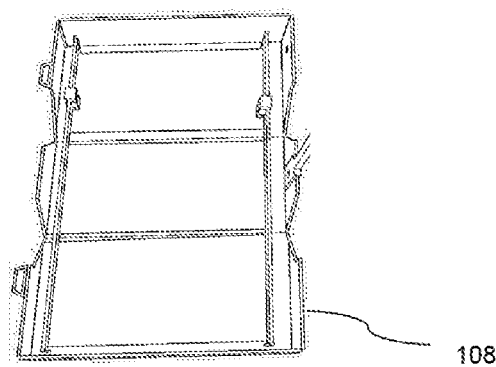
FIGS. 3A-3B illustrated a top view and side view of detachable rails of the device of FIGS. 1A-1B, according to some embodiments of the present disclosure.
Figure 3B:
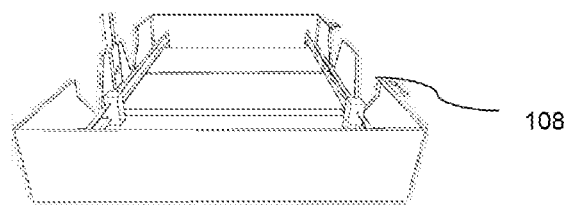

According to an embodiment of the disclosure, the pair of detachable rails 108 are of size of 23", foldable and detachable rails as shown in top view in FIG. 3A and side view in FIG. 3B. The pair of detachable rails 108 is placed on each side of the base at a distance that will cover the A2 size book. The pair of detachable rails 108 comprises two wheels integrated on each side for movement of the page flipping arm 110 placed over it. The pair of detachable rails 108 helps in moving the page flipping arm 110 from right to left and vice-versa for page flipping or turning.

Figure 4:
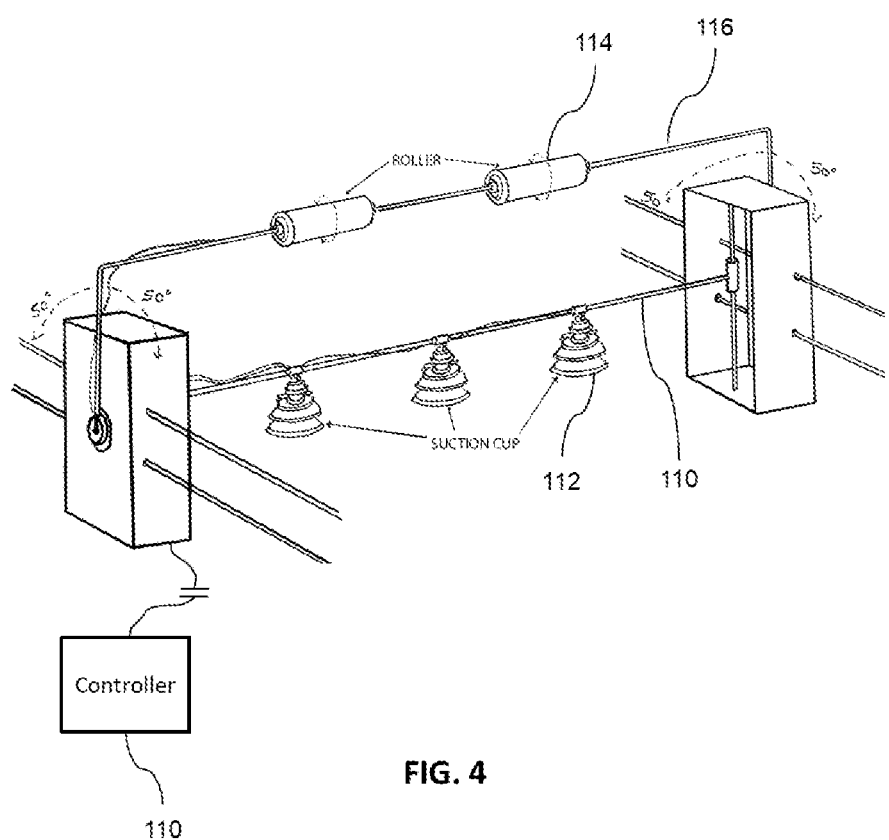
FIG. 4 illustrates a flipping assembly of the device of FIGS. 1A-1B, according to some embodiments of the present disclosure.

According to an embodiment of the disclosure, the one or more suction cups 112 are mini silicon cups designed and placed over the page flipping arm 110 attached to the unit attached to the rails 108 on the base as shown in FIG. 4. The one or more suction cups 112 are configured to function to reform and deform using electromagnetic power, which will create a vacuum that is used to lift the pages. The one or more suction cups 112 are placed on the page flipping arm 110 that is operated by the controller 118 on receiving command for holding pages for the next movement.

According to an embodiment of the disclosure, the page flipping arm 110 is placed on the unit connected to the pair of detachable rails 108. The page flipping arm 110 moves down using a motor (not shown) that will be placed on one side of the rails attached to it and will also move it up to a height where it will be commanded to turn 45 degrees from bottom facing to right with holding the page.

According to an embodiment of the disclosure, the roller rod 116 is a movable holder with the flexibility of moving the roller arm from 90 degrees to 50 degrees top to side. The roller rod 116 is operated by the controller 118 on moving down 50 degrees to the right or the left depending on which side the page requires to be flipped from. The roller 114 is attached to the page flipping arm 110 on the rails 108 that will stand on a rod just above the page flipping arm 110. The roller 114 functions based on the command received from the controller 118. On receiving the command from the controller 118 about the suction cup movement to 45 degrees, the page flipping arm 110 would be activated to turn 50 degrees down right or left where it will sense the placement of the pages over the suction cup and start rolling at a designated speed and number of rotations to separate multiple lifted pages. If only one page gets lifted then the movement will have no effect on the lifted page. Once the pages get separated the roller movement will stop and flip arm will start moving on the rails from right to left, simultaneously the roller 114 that had completed its job will slowly come back to its position on the top.

According to an embodiment of the disclosure, the scanning stand 102 is also configured to able to provide a color contrast bed on which the pages to be scanned can be placed. According to an embodiment of the disclosure, the scanning stand 102 also includes artificial lights (not shown) so that the document to be scanned is uniformly illuminated.

According to an embodiment of the disclosure, the mobile device 106 device is capable of scanning the document using its inbuilt camera and an application installed in the mobile device 106. In an example an Android® device is used as the mobile device 106. Though the use of any other mobile platform such iOS® etc. well within the scope of this disclosure. After a page is scanned, the mobile device 106 app will issue a command to the page flipping arm 110 to flip the page. The page flipping arm 110 on receiving the command to flip the page will carry out this activity and once successful, will communicate to the scanning application on the mobile device 106 to scan the next page/document. The scanning application continues the scanning, storing and flipping till the time all the documents are scanned as per the configuration. According to an embodiment of the disclosure, the scanning application is also configured to detect the edges on the page and able to scan the page and store it in a database (not shown).

According to an embodiment of the disclosure, the page flipping arm 110 is also able to detect an error such as when multiple pages are flipped or the page flipping arm 110 is struck or the illumination to the page is not uniform etc. In case of error, the page flipping arm 110 communicate the error to the scanning application. The page flipping arm 110 is also configured to communicate with the scanning application to indicate that the operation of flipping the page(s) is complete.

Figure 5A:
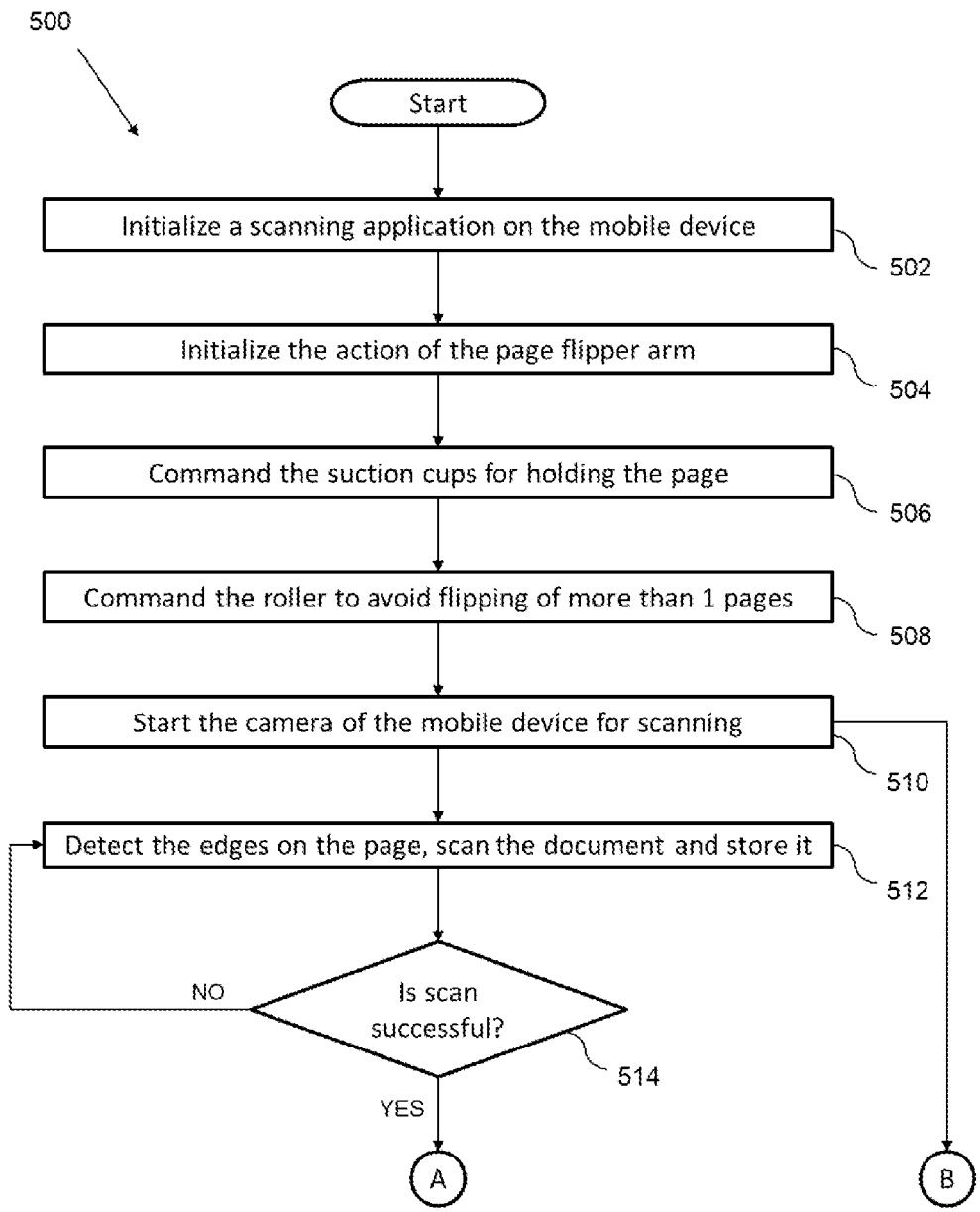
FIGS. 5A-5B illustrates a flowchart for using the device for automatic flipping and scanning of a plurality of documents according to some embodiments of the present disclosure.
Figure 5B:
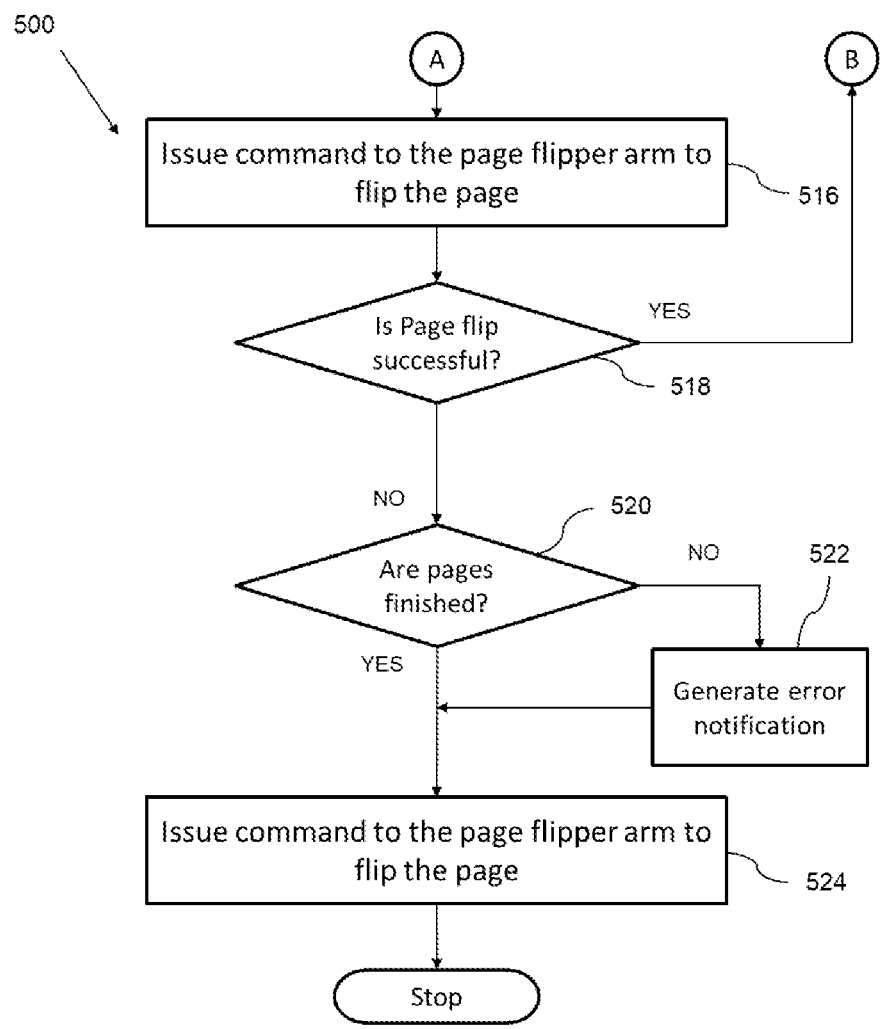

According to an embodiment of the disclosure a flowchart 500 for operating the device 100 for secure and automatic flipping and scanning the plurality of answer sheets is shown in FIG. 5A-5B. At step 502, the scanning application is initialized by the user via the mobile application. The mobile device 106 is preinstalled with the mobile application. The mobile application is in communication with the cloud server (not shown) and will fetch various scan configuration details. Once the entire scan configuration is downloaded on the mobile device 106, the user can start the scanning process. Once the page scanning is initiated, the mobile device 106 first initiates a handshake with the scanning stand 102 to check the connectivity. If the handshake is unsuccessful, it will throw an error message "CHECK STAND CONNECTIVITY". If the handshake is successful, it will check the configuration downloaded from the cloud server and send a command to the controller 118 according to the direction configured for scanning. If it is configured to scan from right to left, it will send command "FLIP LEFT" and if it is configured to scan from left to right it will send command "FLIP RIGHT"

At step 504, a command is provided by the mobile application to initiate the action of the page flipping arm 110. A communication is established between the mobile device 106 and the page flipping arm 110.

In response to the initiation of page flipping action, at step 506 a command is provided by the controller 118 to the suction cups 112 to hold the particular page and move it up for flipping. The command may be provided to the page flipping arm 110 to flip one page forward or flip one page backwards. It should be appreciated that the mobile device 106 can also issue the command to flip more than one number of pages forward or backward as per the requirement of the user.

At step 508, a command is provided via the controller 118 to the roller 114 to avoid flipping of more than one pages at a time.

At step 510, the camera of the mobile device 106 is started. The device 100 is now ready to start the flipping and scanning of the plurality of answer sheets. At step 512, the camera detect the edges on the page, scan the page. The scanning is done by clicking the image of the page in front of it using the camera of the mobile device 106. At step 514, it is checked whether the scan is successful or not. If the scan is not successful then the step of scanning the document is repeated. If the scan is successful then at step 516, an automatic command is issued to the page flipping arm 110 to flip the page.

At step 518 it is checked if the page flipping operation is successful or not. If the page flipping is successful, then whole process is repeated for the new page. If the page flipping is not successful, then at step 520 it is checked whether the pages to be scanned are finished. If the pages are finished then the whole process can be stopped. If the pages are not finished then at step 522, an error notification is generated to the user. The error notification can be in the form of a message to the mobile device 106 or an audio/visual alarm 112 present on the scanning stand 102. Finally at step 524, all the scanned pages are sent to the cloud server for further processing.

It should be appreciated that on multiple instances error messages can be generated on the mobile device 106. Few of the instances are provided below:

When the command is passed on the to the controller to flip the page, but on receiving the command, if the flip process initiation does not get activated because of any kind of technical issue, it will throw back and error message on the mobile device 106 as "FLIP PAGE INTIATION ERROR, CHECK CONNECTIVITY ON CONTROLLER".

While initiating the flip process, the page flipping arm 110 is jammed and does not move down, it will push back and error message to "FLIP ARM JAM ERROR!"

If the flip process gets initiated successfully and the page flipping arm 110 moves down and lifts the paper, but does not initiate the arm rotation to 45 degrees right, will push an error message "FLIP ARM ROTATION FAILED".

If the page flipping arm 110 rotation is successful, but does not initiate the roller 114 to move it will push back with an error message "ROLLER JAM ERROR!"

If the roller has completed the process of separating the pages and if the unit to initiate the movement of the page flipping arm 110 does not start will push back with an error message "FLIP ARM MOVEMENT INITIATION ERROR".

If the page flipping arm 110 has now initiated the movement from right to left and gets stuck in between while flipping the page, will push back an error message "FLIP ARM MOVEMENT STOPPED, CHECK UNIT!".

If the page flipping arm 110 has completed the movement from right to left and does not release the page, it will push back and error message "PAGE RELEASE FAILURE!"

If the page flipping arm 110 is successful in releasing the page from right to left and gets stuck at the release position, it will push back an error message "FLIP ARM REVERSE MOTION FAILURE!"

If the page flipping arm 110 has completed the movement to its initial position after the page has successfully been flipped, but the controller 118 does not receive any signal from the page flipping arm 110, will push back an error message "FLIP ARM COMMUNCIATION FAILURE"

According to an embodiment of the disclosure, the device 100 is also configured to detect duplicate or clone copies. The device can be made more resilient to the mechanical scanning errors by automatically analyzing the scanned images. For example, if the scanning stand 102 indicates to the mobile device 106 that it has flipped the page, but in reality it has failed while flipping the page, then this can be detected by using the AI capabilities of the scanning application. The scanned image can be sent to the AI algorithm to detect the places where the answer sheet page number is present, and this can be compared with subsequent scanned image. If the page number is still the same then it is for sure a failure on the part of the scanning stand. Thus it can be then rectified either by alerting the user or by resetting the flipping arm.

According to an embodiment of the disclosure, the device 100 is also configured to find out any missing pages of the plurality of answer sheets by detecting page numbers using algorithms. The device 100 can be made more resilient to the mechanical scanning errors by automatically analysing the scanned image. For example, if the mechanical scanning stand indicates to the mobile device that it has flipped one page, but in reality it has flipped more than one page, then this can be detected by using the AI capabilities of the scanning application. The scanned image can be sent to the AI algorithm to detect the continuity of the scanned page number. If the AI algorithm detects that the numbers have been skipped, then it is a failure on the part of the mechanical scanning stand and the same can be rectified by asking the arm to move back the required number of pages, or if that also fails then alerting the user about the failure with a clear indication of the failure.

According to an embodiment of the disclosure, the device 100 is also equipped with a diagnostic utility to detect any issues in the scanning stand. The device is using an AI algorithms to analyse the patterns of old issues and detect symptoms for failure before the fatal error. This feature provides the ability to have an early failure warning system for the scanning stand. All the previously encountered errors such as arm failure, detection problems etc. can be categorically stored on the cloud servers and the AI algorithm can analyse the errors reported and can then generate an early failure alarm or report which can be used to avoid the failure of the scanning stand when it is most required. Thus making sure that the scanning stand is available to the institute/faculty when it is the most needed.

According to an embodiment of the disclosure, the all scanned documents are stored in the database. The user will be able to see all the documents which was scanned, and he can review the same, and will be able to scan a single document if needed by giving the instruction from the scanning application. Once satisfied with the scan, the user will also be able to send all the scanned images on the mobile device 106 to the cloud server for further processing and utilization.

According to an embodiment of the disclosure, the device 100 is also configured to use an artificial intelligence (AI) algorithm to detect the identity of the candidate's from the handwriting written on the answer sheet. Thus, the device 100 is able to intelligently detect malpractice if the handwriting does not match as per the roll no/candidate's handwriting. For utilizing the AI algorithm, sampling of the candidates' handwriting and training algorithm is done in advance. The mobile application which is running on the mobile device when is used in a particular class, it can be trained on the handwritings of each individual candidates appearing for the examination. This can be done by first running the mobile device 106 in training mode where it is allowed to scan the handwriting of the candidates and then tagging the answer sheets to the particular candidate. This can be done a couple of times till the AI is trained. Then once enough trained data is available, the next scans can be run through the AI algorithm in the real time on the cloud server to recognize the candidate, and then fill their identity without any manual intervention from the faculty. This feature can be further extended to make sure that the answer sheet/ assignment is written in its entirety is written by the same person and that there are not multiple person handwriting involved. And if involved the other students can be identified based on their handwriting comparison.

According to an embodiment of the disclosure, the device 100 is also configured to reduce the manual effort required to assess the answer sheets. This can be done in multiple ways.

Firstly, optical character recognition (OCR) or any other similar technique can be used to automatically mark the objective answers present on the answer sheets without any human intervention. The scanned copies of the answer sheet can be processed by the mobile device 106 to the OCR process or through the AI algorithm running on the cloud server through the internet, to process quickly the common tasks such as the objective answers. This eliminates the need to manually mark the objective type of answers.

Secondly, the device 100 can leverage in-house algorithms to convert subjective answers' image to text. Some kind of AI algorithm can be used to marking the text by analyzing grammar, words, keywords etc. Partial human intervention is required to validate the results. This capability is that the application running on TCS iON PAPER will change the subjective answers image to text. This text can be then sent to the cloud server through the internet and then it will be used by the AI algorithm to mark the text, analyze grammar, spelling, contextual use of the words etc. and mark accordingly, thus reducing the workload of the answer sheet assessor.

Thirdly, according to an embodiment of the disclosure, the device 100 can be used to mark the children assignments like drawings/activities and mark them using AI algorithms against the required colours, shapes etc. This capability extends the devices capability to digitize the assignments like drawings/sketches etc. and then sends these digitized copy to the AI algorithm running on the cloud server to analyse it for the shape/colours, spillage outside of the lines etc and mark it accordingly, making it quicker to evaluate.

According to an embodiment of the disclosure, the device 100 is also configured to generate a security token for each scanned copy which enables to track individual appliance, location/GPS and requestor. The security token can be generated with each and every scanned image and this can be embedded in the scanned image at the bit level within the file. The security token consists of the device signature along with other vital information such as the mobile device identity number, the geo location, the date and time the image was created etc. The security token can be validated by the education ecosystem to verify that the images are being scanned by a legit system and not provided by any other fraudulent party. Thus it can be used to secure the digitization process.

According to an embodiment of the disclosure, the device 100 may also contain marquee features like auto-cropping the scanned images as per the configuration provided by the user or by detecting document's dimensions. The mobile application is able to download the scanning configuration from the education cloud system, the system can be configured with the number of pages which a particular school or university uses. Once configured this configuration can be downloaded by all the scanning application of the school/university while they are scanning and this can be used to quickly and automatically scan the answer sheets of the candidates.

According to an embodiment of the disclosure, the device 100 may also include a QR code and bar-code feature to capture the document meta-data. The user can leverage this feature to capture any information as required against the document like organization's file Id etc. This feature provides the scanning application the capability to scan and identify multiple meta data points such as the information contained in the barcode/qr code (such as the answer booklet serial number/any secret code etc) and populate the related metadata with the scanned image.

According to an embodiment of the disclosure, the device 100 also comprises the mobile device tracking module to detect malpractice and enable remote proctoring to get more details of the culprits. This feature provides the capability to the device application to use the devices front and back camera for image capture of the answer sheet/booklets but to also capture the images of its surroundings and the scanning personnel so for having evidence, in case there is any malpractice during the scanning.

According to an embodiment of the disclosure, the device 100 is also configured to disable the mobile device remotely in case of any critical alerts or lost due to theft. This feature provides the capability to the educational institution to remotely control the scanning device. If it is known that a particular center has the history of malpractice or that a device is lost to theft then that particular device can be locked/disabled. Similarly the device can be disabled or locked if the scanning appliance is reporting critical errors such as repeated failure to flip the pages or multiple page flipping.

According to an embodiment of the disclosure, the device 100 is also provided with the auto-backup or cloud first approach feature to preserve digital copies in case of disasters. In the absence of internet store documents offline to be synced later. This feature provides the capability to the scanning device to push all the scanned images directly to the cloud server for storage and immediate or deferred processing. The immediate processing such as running the images through the AI or machine learning algorithms to quickly process and provide value added functions such as quick marking, error detection, backup etc. If the device is not immediately connected then the local storage can be used to store the scanned images and then to upload to the cloud server when the internet connection is restored.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of costly, time consuming and insecure devices of document scanning in education institutions. The embodiment, thus provides the device for secure and automatic flipping and scanning of plurality of answer sheets after the examination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A device for automatic flipping and scanning of a plurality of answer sheets, the device comprising:
   a scanning stand configured to hold the plurality of answer sheets;

a page flipping arm connected to the scanning stand, wherein the page flipping arm is configured to flip one or more pages of the answer sheets;

one or more suction cups attached on the page flipper arm, the one or more suction cups are configured to hold the page for flipping;

a roller attached on the scanning stand configured to avoid flipping of more than one pages at a time;

a controller to control the operation of the scanning stand, the page flipper arm and the roller;

a mobile device configured to be attached on a holder present in the scanning stand, wherein the mobile device comprising a mobile application in communication with the controller, wherein the mobile application configured to:

command the controller to initiate the flipping of a particular page from amongst the one or more pages;

command, via the controller, the suction cup to hold the particular page and move the particular page up for flipping;

command, via the controller, the roller to avoid flipping of more than one page at a time;

command, via the controller, a camera present in the mobile device to scan the particular page;

send the scanned page to a cloud server; and repetitively performing the step from "commanding the controller" to the "sending of scanned page", until a predefined number of pages of the plurality of answer sheets are scanned.

2. The device of claim 1, wherein the suction cup is using electromagnetic power to create a vacuum to hold the pages.

3. The device of claim 1 further configured to scan the one or more pages in one of a first direction and a second direction, the first direction being laterally opposite to the second direction from left to right or right to left direction.

4. The device of claim 1 further comprising one or more artificial lights configured to uniformly illuminate the answer sheets to be scanned.

5. The device of claim 1, wherein the mobile application is configured to detect the identity of a candidate by scanning the handwriting written on the plurality of answer sheets.

6. The device of claim 1, wherein the mobile application is configured to:
scanning the plurality of answer sheets to obtain scanned text, and
sending the text to the cloud server for analysis using an algorithm to mark the text.

7. The device of claim 1, wherein the mobile application is configured to:
convert a plurality of drawings present in the plurality of answer sheets into digitized copy, and
sending the digitized copy to the cloud server for analysis using the algorithm to mark the drawings.

8. The device of claim 1, wherein the mobile application further configured to generate a security token corresponding to each of the scanned pages.

9. The device of claim 1, wherein the mobile device comprising a QR scanning sensor to scan one or more of a QR code or a bar code to capture corresponding metadata.

10. The device of claim 1 further comprising an early failure warning system for the scanning stand to alarm a user to avoid failure of the scanning stand, wherein the early failure warning system is generated using prior history of the scanning stand.

11. The device of claim 1, wherein the mobile application is further configured to detect at least one of:
multiple scanning of similar pages in the plurality of answer sheets, and
missing of one or more pages from the plurality of answer sheets.

* * * * *